Patented Oct. 9, 1945

2,386,287

UNITED STATES PATENT OFFICE 2,386,287

PRODUCTION OF EMULSIONS OR COMPOSITIONS OF OR CONTAINING ORGANIC POLYSULPHIDES AND ARTICLES PRODUCED THEREFROM

John Rodriguez Blanco, Wylde Green, Sutton Coldfield, Albert Edward Toney Neale, Erdington, Birmingham, and Douglas Frank Twiss, Sutton Coldfield, England, assignors to Dunlop Rubber Company Limited, London County, England, a British company No Drawing. Application March 16, 1943, Serial No. 479,380. In Great Britain March 2, 1942

10 Claims. (Cl. 260—79)

Our invention is one for the improved preparation of organic polysulphide plastics such as are obtained by the interaction of an organic dihalide and a soluble inorganic polysulphide such as an alkali or alkaline earth polysulphide.

It has hitherto been customary to prepare such polysulphide products by adding the organic halogen compound to the heated aqueous solution of the alkali polysulphide, e. g. sodium polysulphide. Formed in this manner the product coalesces to a cohesive mass which interferes with stirring, and consequently with the homogeneity of the reaction product which may enclose aqueous and other impurities. In order to obviate this disadvantage it has been proposed to add to the reaction mixture what has been described as a "dispersing agent" such as freshly precipitated magnesium hydroxide, chromium hydroxide, gelatin, glue, or a finely divided oxide, hydroxide, or carbonate of any alkaline earth metal. Other finely dispersed solids which have been used for the same purpose include barium sulphate and aluminium silicate. Granular products have also been obtained by carrying out the reaction in the presence of a water-soluble alkyl cellulose or of a mixture of egg albumen and magnesium hydroxide, the latter being formed in situ. The characteristics of such additions appears to be that while they will not react harmfully with the starting materials, the reaction product will adhere to them and so will separate in a granular discontinuous form of suspension.

We have discovered that improved results and products can be obtained by reacting the organic halogen compound in a preemulsified condition with an aqueous solution of an alkali polysulphide or alkaline earth polysulphide. By known methods, e. g. using a colloid mill, a cream-making machine, or other mechanical means affording intimate contact and extreme subdivision it is possible to form a fine emulsion of the organic halogen compound in water containing a small proportion of water-soluble emulsifying agent, such as of a soap or of a complex sulphonate type. The stable aqueous emulsion thereby obtained containing the emulsified microscopic droplets of the organic halogen compound in an electrically charged condition with a negative electric charge is then allowed to undergo chemical reaction with the aqueous solution of the alkali or alkaline earth polysulphide, to which also a small quantity of emulsifying agent such as of potassium oleate or of an alkali salt of a complex sulphonate acid may be added.

On account of the two continuous phases being aqueous the emulsion mixes with the sodium polysulphide solution easily and freely. The need for stirring is reduced and homogenisation of the liquid by stirring is effected without difficulty. The reaction proceeds easily at slightly elevated temperature and the emulsified halogen compound disappears readily and completely with the formation of the desired organic polysulphide. The freedom of the reaction mixture from relatively large volumes of the organic chloride prevents contamination of the product by absorption of the resulting polysulphide in unaltered halogen compound. On account of the conditions under which reaction takes place, the immediate product is an aqueous emulsion of the organic polysulphide free from contamination by insoluble inorganic particles.

The reduction in the amount of necessary stirring possible with the procedure described favours the formation of the product completely in the emulsified form. The addition of the emulsion of the organic halogen compound gradually or by instalments is also helpful in this direction.

According to this invention a process for preparing improved emulsions of or containing organic polysulphides comprises causing a soluble inorganic polysulphide in the form of an aqueous solution to react with one or more aliphatic organic di-halogen compounds in the form of an aqueous emulsion.

This method of bringing together the reagents is of especial advantage when concurrent interaction of a mixture of organic halogen compounds with the inorganic polysulphide is required. The preformed mixture of the organic halogen compounds in the desired proportions is emulsified in the same way as a single halogen compound would be and is introduced into the alkali polysulphide solution. Each droplet in the emulsified mixture is identical in composition with the original bulk of the mixture and this method of introducing the mixture into the alkali polysulphide or alkaline earth polysulphide ensures a more uniform product.

In order to purify the resulting emulsion of organic polysulphide from alkali chloride and/or other salts which remain in solution in the aqueous medium the emulsion may be allowed to "cream" or settle; the emulsified particles, on account of their greater specific gravity, tend to concentrate below a layer of supernatant medium. The latter can then be removed from the concentrated emulsion by mechanical separation e. g. by decantation or syphoning.

In the immediately formed emulsion of organic polysulphide produced by the reaction, the dissolved saline substances resulting concurrently from the chemical reaction assist the "creaming" or separation. Their presence may lead to a reversible and temporary association of the individual particles in the emulsion of organic polysulphide so that loose and easily resolved complexes or flocculates are formed which have increased power of separation. After re-dilution of the concentrated emulsion so separated, however, the saline content of the mixture is reduced and the "salting out" effect becomes insufficient, the flocculated material returning spontaneously to its earlier finely emulsified condition. In order to assist the deflocculation the liquid used for the purpose of dilution may contain a small proportion of protective colloid or emulsifying agent, for the further purification of the emulsion by separation or settling, it may therefore be necessary to add a small proportion of a creaming agent such as sodium alginate to assist settling, or preferably to apply some centrifugal means of concentration of the emulsion. By this procedure it is possible to obtain stable emulsions containing proportions of the organic polysulphide as high as 140 grams per 100 cc. or 90% by weight. The more highly concentrated emulsions are of pasty consistency.

Other methods of purification may be adopted e. g. dialysis or electro-dialysis as well as other methods of concentration e. g. by evaporation.

For the further stabilisation of such emulsions small proportions of known stabilising agents or protective colloidal substances may be added such as casein or gelatin.

The emulsions so obtained can be used in the manner of known "latex processes," as practised with rubber latex, to produce articles by spreading, dipping, extruding, etc., in the various modifications of these operations. By simple coagulation, e. g. by the addition of an acid, the purified emulsions can be made to yield correspondingly pure organic polysulphide products.

Furthermore, by subjecting the emulsions produced by our process to increased temperature, preferably under mildly alkaline conditions, e. g. with the addition of a small proportion of a volatile alkali, it is possible to effect a sort of "vulcanisation" whereby the physical characteristics of the emulsified colloidal product are improved and consequently also the mechanical qualities of the articles produced therefrom.

The invention may be conveniently carried into effect as shown in the following examples.

*Example 1*

80 gms. sodium sulphide, $Na_2S.9H_2O$, was mixed with 32 gms. powdered sulphur and 100 ccs. water. The mixture was boiled for 5 hours during which the sulphur dissolved and a stable solution of sodium polysulphide was formed. The composition of the polysulphide corresponded to the tetrasulphide of sodium, $Na_2S_4$, which was considered to predominate in the solution. This was filtered free of undissolved impurities, diluted to 400 ccs. with water and 4 gms. potassium oleate dissolved in it.

32 gms. ethylene dichloride was emulsified in water by mixing it with 60 ccs. of a 1% potassium oleate solution in water and passing the mixture through an emulsifying machine. A very fine dispersion was thus obtained in which droplets of ethylene dichloride settled only very slowly.

The polysulphide solution in a flask fitted with a mechanical stirrer was maintained at 50° C. in a water bath. The ethylene dichloride emulsion was added gradually over a period of half an hour with gentle stirring sufficient to cause adequate mixing of the emulsion throughout the reaction vessel as it was added. Initially the emulsified ethylene dichloride was seen to dissolve and later a cloudy precipitate of the ethylene polysulphide appeared. Heating was continued at 50° C. for 15 minutes after the addition of the ethylene dichloride emulsion. The ethylene polysulphide was then in the form of flocculates of visible size which settled within a few minutes to form a concentrated suspension under a layer of mother liquor.

The polysulphide solution was decanted from the suspension and the suspension stirred into 500 ccs. water containing 1% of potassium oleate. After gentle stirring the flocculates were now much smaller and settling was less rapid. A repetition of this process of decantation and dilution gave a suspension in which the separate particles were not visible and which did not settle readily. Further purification was carried out by centrifuging which accelerated the settling and permitted decantation of the solution.

The process of centrifuging, decanting and redilution in 1% potassium oleate solution was repeated 3 times, after which the proportion of sodium salts remaining was negligible. After pouring off the supernatant liquid, the product was removed from the centrifuge as a thick white paste which contained 90% by weight of solid material. This paste was easily diluted with water or with a solution containing stabilisers giving an emulsion of ethylene polysulphide which at a concentration of 70 gms. per 100 ccs. was white in colour and of milky appearance.

By way of contrast to the above the following shows the effects obtained by the use of ethylene dichloride in a non-emulsified condition.

A sodium polysulphide solution was prepared as above, diluted to a volume of 400 ccs. and 4 gms. of potassium oleate dissolved in it.

The solution was maintained at 50° C. in a flask and well stirred. 30 gms. ethylene dichloride was added drop by drop in a non-emulsified condition over a period of half an hour. Heating was again at 50° C. and stirring was continued for a further half hour after the addition.

At the end of this time the ethylene polysulphide was found to be formed partly as a suspension similar to that obtained as described above, and partly as a plastic mass which contained occluded ethylene dichloride. This shows that the important advantage according to this invention cannot be obtained by the method in which the ethylene polysulphide is used in a non-emulsified condition.

*Example 2*

A dispersion of ethylene polysulphide was prepared by chemical reaction between emulsified ethylene dichloride and sodium polysulphide as in Example 1.

After removal from the reaction vessel, the process of decantation and dilution described in Example 1 was carried out twice.

To enable the purification to be carried out further sodium alginate was added to give a concentration of 0.15% in the solution. 5 ccs. of concentrated ammonium hydroxide was also added and under these conditions settling was aided giving a sharp separation of the concentrated suspension from the supernatant solution, which was easily decanted. The suspension was again diluted with water and was caused to settle as before in the presence of 1% potassium oleate, 0.16% sodium alginate and ammonia in the solution. Repetition of this process of "creaming" and decantation six times resulted in an emulsion containing 70 gms. ethylene polysulphide per 100 ccs. and substantially free from the saline products of reaction.

*Example 3*

An emulsion of ethylene polysulphide was prepared and purified by a method similar to that described in Example 1. In this case, however, the emulsifying agent used in place of potassium oleate was the sodium salt of sulphonated lauryl alcohol at present sold under the registered trade-mark "Lorol." The concentration used was ½% of the latter and 1% glue was also used as a protective agent throughout the preparation and purification of the emulsion.

After purification by repeated centrifuging the emulsion was diluted to a concentration of 40 gms. per 100 ccs. and 1% of pyridine added to it. The emulsion was then transferred to a closed vessel and heated in a steam autoclave at 140° C. for 45 minutes.

The emulsion was unchanged in appearance by this treatment and was concentrated to a greater strength, viz., approximately 80 gms./100 ccs. by centrifuging. On drying out a layer of the concentrated emulsion at 40° C. a smooth coherent film of ethylene polysulphide remained. The properties of this film when compared with those of a similar film prepared from the untreated emulsion, showed that a form of vulcanisation had taken place.

The material obtained from the vulcanised emulsion had improved mechanical and ageing properties. The after-hardening and loss of elasticity which frequently occur in uncured ethylene polysulphide did not develop in the "cured" material even after keeping at room temperature for a long period.

Having described our invention, what we claim is:

1. A process for preparing emulsions of or containing organic polysulphides which comprises completely mixing an aqueous solution of a soluble inorganic polysulphide with an aqueous emulsion of an aliphatic organic di-halogen compound and obtaining the reaction product in the form of a flocculate and washing the dispersed particles of said flocculate to decrease the amount of soluble compounds in the dispersing medium.

2. A process for preparing emulsions of or containing organic polysulphides which comprises completely mixing an aqueous solution of a soluble inorganic polysulphide with an aqueous emulsion of an aliphatic organic di-halogen compound and obtaining the reaction production in the form of a flocculate, creaming said flocculate, removing the creamed flocculate from the aqueous medium and rediluting.

3. The process of claim 2 in which said flocculate is creamed with sodium alginate.

4. A process for preparing emulsions of or containing organic polysulphides which comprises completely mixing an aqueous solution of a soluble inorganic polysulphide with an aqueous emulsion of an aliphatic organic di-halogen compound and obtaining the reaction product in the form of a flocculate and freeing the dispersing medium of said flocculate from dissolved impurities by dialysis.

5. A process for preparing emulsions of or containing organic polysulphides which comprises completely mixing an aqueous solution of a soluble inorganic polysulphide with an aqueous emulsion of an aliphatic organic di-halogen compound and obtaining the reaction product in the form of a flocculate and heating said flocculate in the presence of a volatile alkali.

6. The process of claim 5 in which said volatile alkali is pyridine.

7. A process for preparing improved emulsions of or containing organic polysulphides which comprises completely mixing an aqueous solution of an inorganic polysulphide with an aqueous emulsion of an aliphatic organic dihalogen compound and obtaining the reaction product in the form of a flocculate.

8. A process for preparing improved emulsions of or containing organic polysulphides which comprises completely mixing an aqueous solution of an inorganic polysulphie with an aqueous emulsion of an aliphatic organic dihalogen compound and obtaining the reaction product in the form of a flocculate and then concentrating the flocculate obtained from the reaction.

9. A process for preparing improved emulsions of or containing organic polysulphides which comprises completely mixing an aqueous solution of sodium polysulphide with an aqueous emulsion of aliphatic organic dihalogen compound and obtaining the reaction product in the form of a flocculate.

10. A process for preparing improved emulsions of or containing organic polysulphides which comprises completely mixing an aqueous solution of an inorganic polysulphide with an aqueous emulsion of ethylene dichloride and obtaining the reaction product in the form of a flocculate.

JOHN RODRIGUEZ BLANCO.
ALBERT EDWARD TONEY NEALE.
DOUGLAS FRANK TWISS.